United States Patent [19]
Johnson et al.

[11] 3,723,034
[45] Mar. 27, 1973

[54] VANE END AND TIP ASSEMBLY

[75] Inventors: Harry T. Johnson, Westerville; Robert K. Mitchell, Hilliard, both of Ohio

[73] Assignee: Battelle Development Corporation, Columbus, Ohio

[22] Filed: Oct. 26, 1971

[21] Appl. No.: 192,180

[52] U.S. Cl. ................................................418/268
[51] Int. Cl. ..............................................F04c 27/00
[58] Field of Search...........418/26, 27, 268, 269, 260

[56] References Cited

UNITED STATES PATENTS

| | | | |
|---|---|---|---|
| 830,334 | 9/1906 | Kummerow | 418/147 |
| 1,087,962 | 2/1914 | Matchette et al. | 418/147 |
| 2,461,377 | 2/1949 | Gilson | 418/147 |
| 3,099,964 | 8/1963 | Eickmann | 418/147 |
| 3,450,108 | 6/1969 | Rich | 418/148 |
| 3,647,328 | 3/1972 | Fox | 418/147 |

*Primary Examiner*—C. J. Husar
*Attorney*—William J. Mase et al.

[57] ABSTRACT

A pivoting vane tip in a sliding-vane rotary moving-fluid device. For increased load capacity the bearing pad is wider than the central cylindrical pivot portion. A moment compensator portion provides outwardly extending surfaces for counteracting, with the same pressures, the moments produced by differential pressures on leading and trailing surfaces of the bearing pad, to provide a net rotational moment of substantially zero and thus to maintain substantially the optimum angle between the bearing surface and the cam during rotation at high speed, to minimize friction and wear.

17 Claims, 2 Drawing Figures

VANE END AND TIP ASSEMBLY

BACKGROUND OF THE INVENTION

This invention relates to a vane end and tip assembly for the outer end of each vane in a sliding-vane rotary moving-fluid device. It has to do particularly with improvements in a pivoting vane tip and the adjacent assembly to compensate for moments produced by differential pressures on leading and trailing surfaces of the pivoting tip that could be detrimental to the bearing surface during operation at high speed.

The present invention is useful in such devices as the variable-displacement turbine-speed hydrostatic pumps of U.S. Pat. Nos. 3,407,742 and 3,514,232 of Mitchell, Swain, Thomas, and Wilcox; as well as in the high-speed pumps of U.S. Pat. No. 3,604,823 of David L. Thomas; United States Patent application Ser. No. 68,398, filed Aug. 31, 1970, now U.S. Pat. No. 3,640,651 of Harry T. Johnson; and United States Patent application Ser. No. 80,038, filed Oct. 12, 1970, now U.S. Pat. No. 3,672,796 of Robert K. Mitchell.

A primary objective of this invention is to provide a vane tip which acts as a hydrodynamic thrust bearing capable of supporting all radial vane loading without contact between the vane tip surface and the cam ring surface of vane-type fluid handling devices. The loading is supported by the self-generated hydrodynamic pressure produced in the fluid film between the tip and cam ring surfaces. The generation of the hydrodynamic film allows for operation at increased relative surface speeds between the tip and cam ring with the corresponding reduction in friction and component wear rates normally characteristic of hydrodynamic lubrication.

The invention provides the necessary tip rotational freedom that allows the tip bearing surface to follow the cam ring surface as the angle between the normal to the cam surface and the vane center line varies during a complete rotational cycle of the fluid handling device. This rotational freedom also provides the tip bearing with the self-adjusting taper angle capability of a tilting-pad bearing to produce optimum operation over a wider range of operating conditions.

Since the vane tips in a fluid handling device are subjected to differential pressure across their width, this invention incorporates the necessary features which insure that the net hydrostatic rotational moment applied to the tip is essentially zero for all operating conditions. It therefore assures that stable tip rotational equilibrium is achieved. This equilibrium is necessary to obtain proper orientation between the tip bearing surface and the cam ring surface to promote the hydrodynamic load carrying pressures in the film.

SUMMARY OF THE INVENTION

Typical apparatus according to the present invention comprises in a sliding-vane rotary moving-fluid device of the type comprising a cylindrical rotor having vanes slidable in substantially radial directions therein with the tip of each vane maintaining substantial contact with the inner cylindrical surface of a cam surrounding the rotor as it traverses sealing spaces and port spaces in the cam alternately during rotation and with the vane and tip thereby intermittently subjected to differences in pressure between the leading and trailing sides thereof, a vane end and tip assembly at the outer end of each vane comprising a vane tip mounted in the end of the vane to be pivotable about an axis substantially parallel to the axis of the rotor, comprising a central portion comprising substantially a right circular cylinder, a bearing pad portion extending radially from the central portion toward the cam and having adjacent the inner cam surface a bearing surface on curvature that is at least equal to that of the inner cam surface (i.e., the average radius of curvature of the bearing pad portion is equal to or smaller than that of the inner cam surface in any region thereof), a first surface extending from the leading edge of the bearing surface to the leading side of the central portion, and a second surface extending from the trailing edge of the bearing surface to the trailing side of the central portion, and a moment compensator portion extending radially from the central portion substantially oppositely from the bearing pad portion, comprising approximately a portion of a right circular cylinder with its axis parallel to the axis of the central portion, having a third surface extending from the leading side of the central portion to the leading edge of the cylindrical outer surface and a fourth surface extending from the trailing side of the central portion to the trailing edge of the cylindrical outer surface, means for applying simultaneously against the third surface the pressure to which the first surface is subjected, and means for applying simultaneously against the fourth surface the pressure to which the second surface is subjected, the areas of the first, second, third, and fourth surfaces being selected to provide a net rotational moment from the intermittently different pressures thereon that is substantially equal and opposite to the moment resulting from the pressures on the bearing surface.

The bearing surface typically comprises approximately a portion of a right circular cylinder with its axis substantially parallel to the axis of the inner cam surface, and preferably with its radius of curvature smaller than that of any portion of the adjacent inner cam surface. The bearing surface preferably is wider than the diameter of the central portion. Typically the adjacent region of the first surface extends approximately perpendicularly from the leading edge of the bearing surface and the adjacent region of the second surface extends approximately perpendicularly from the trailing edge of the bearing surface.

In typical operation, a film of fluid is present continuously between the bearing surface and the inner cam surface during rotation. The cylindrical outer surface of the moment compensator portion of the vane tip maintains substantially continuous at least line contact with the vane over their length to form a seal between the pressure on the third surface and the pressure on the fourth surface. The moment compensator portion typically is substantially coaxial with the central portion and its radius is greater than the radius of the central portion. The pivot axis of the vane tip typically is in a fixed position relative to the vane, and this position typically is in a plane approximately equidistant from the leading and trailing edges of the bearing surface. Where the device may rotate in either direction, the vane tip is substantially symmetrical about a plane between its leading side and its trailing side, and the pivot axis is in the plane of symmetry. Where the device may rotate in one direction only, the pivot axis of the vane tip may be in a plane nearer to the trailing edge than to the leading edge of the bearing surface.

The end of the vane typically forms a recess along its length within which recess the moment compensator portion and a substantial part of the central portion of the vane tip are positioned with the leading side of the central portion maintaining substantially at least line contact along at least a portion of its length with a leading surface in the recess, with the trailing side of the central portion maintaining substantially at least line contact along at least a portion of its length with a trailing surface in the recess, with the cylindrical outer surface of the moment compensator portion maintaining substantially continuous at least line contact with an inner surface in the recess over their length to form a seal between the leading and trailing regions of the recess, with a portion of the leading region of the recess forming a leading chamber therein adjacent the third surface of the vane tip, and with a portion of the trailing region of the recess forming a trailing chamber therein adjacent the fourth surface of the vane tip. Also included are means for communicating the leading chamber in the recess with the region between the rotor and the cam adjacent the leading side of the vane, and means for communicating the trailing chamber in the recess with the region between the rotor and the cam adjacent the trailing side of the vane. The communicating means typically comprise passages in the vane from the leading and trailing chambers to the respective leading and trailing regions between the rotor and the cam.

DESCRIPTION OF A PREFERRED EMBODIMENT

Figure 1:
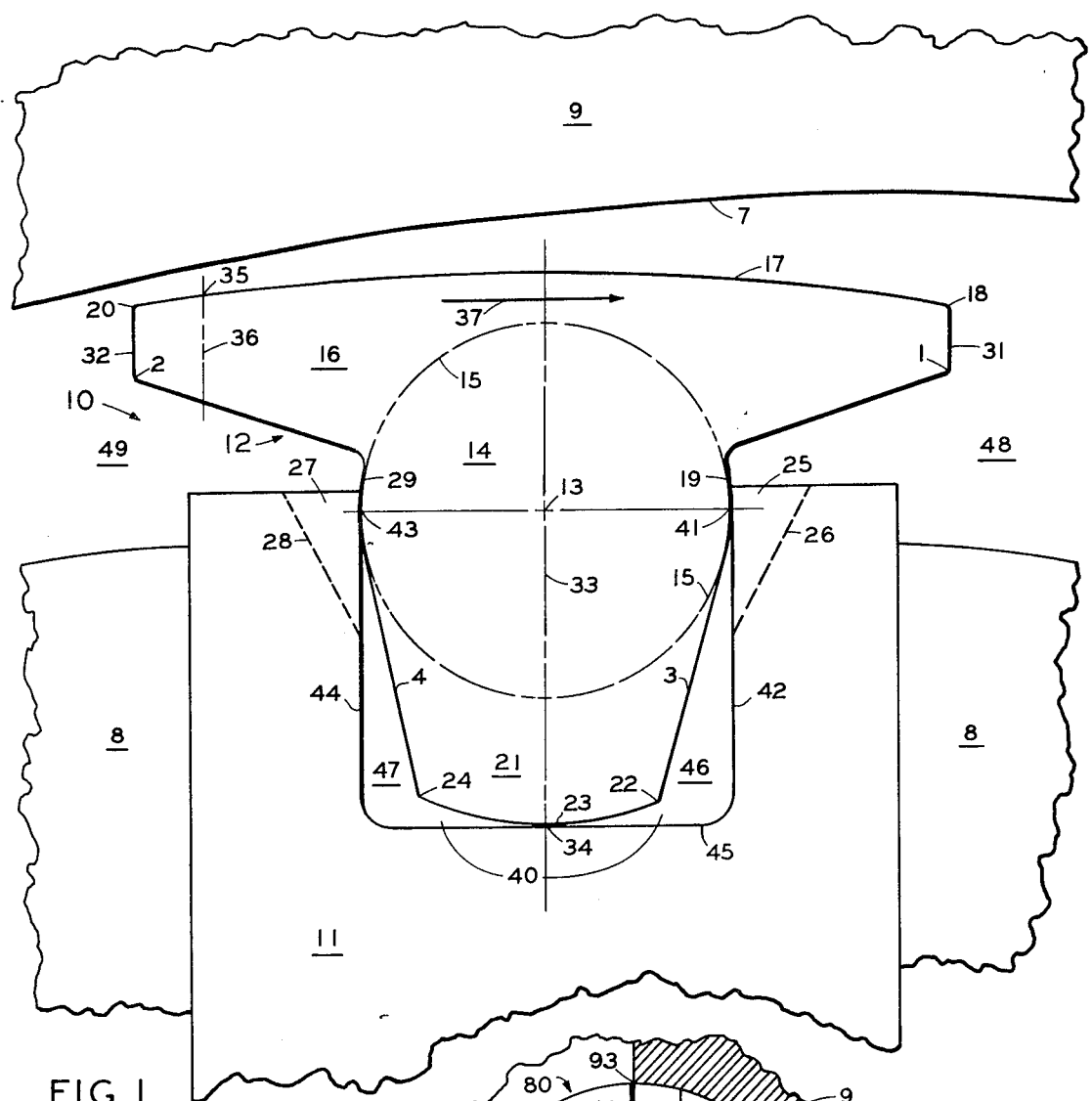
FIG. 1 is an end view of a vane end and tip assembly with adjacent portions of the rotor and cam in a sliding-vane rotary moving-fluid device.
Figure 2:
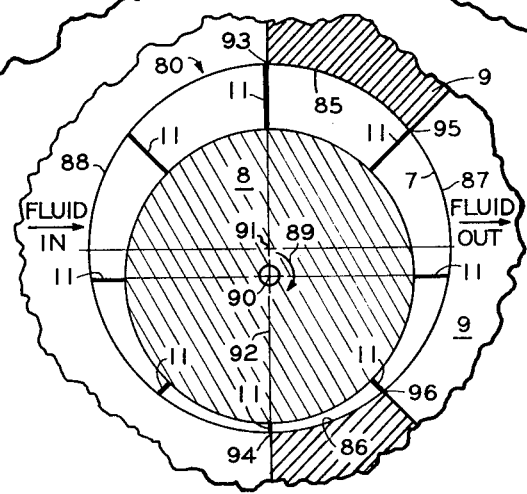
FIG. 2 is a transverse cross-sectional view, simplified and largely schematic, of the central working portion of a typical sliding-vane rotary moving-fluid device in which a vane end and tip assembly according to the present invention is advantageously incorporated.

A presently preferred embodiment of this invention as shown in FIG. 1 is especially useful in a sliding-vane rotary moving-fluid device 80, as in FIG. 2, of the type comprising a cylindrical rotor 8 having vanes 11 slidable in substantially radial directions therein with the tip 12 of each vane 11 maintaining substantial contact with the inner cylindrical surface 7 of a cam 9 surrounding the rotor 8 as it traverses sealing spaces 85,86 and port spaces 87,88 in the cam 9 alternately during rotation and with the vane 11 and tip 12 thereby intermittently subjected to differences in pressure between the leading and trailing sides thereof.

In FIG. 1, a vane end and tip assembly 10 at the outer end of each vane 11 comprises a vane tip 12 mounted in the end of the vane 11 to be pivotable about an axis 13 substantially parallel to the axis 90 of the rotor 8. The vane tip 12 comprises a central portion 14 comprising substantially a right circular cylinder as indicated by the circle 15 in FIG. 1; a bearing pad portion 16 extending radially from the central portion 14 toward the cam 9 and having adjacent the inner cam surface 7 a bearing surface 17 of curvature that is at least equal to that of the inner cam surface 7, a first surface 1 extending from the leading edge 18 of the bearing surface 17 to the leading side 19 of the central portion 14, and a second surface 2 extending from the trailing edge 20 of the bearing surface to the trailing side 29 of the central portion 14; and a moment compensator portion 21 extending radially from the central portion 14 substantially oppositely from the bearing pad portion 16, comprising approximately a portion of a right circular cylinder with its axis (either at 13 or below 13 on the line 33) parallel to the axis 13 of the central portion 14, having a third surface 3 extending from the leading side 19 of the central portion 14 to the leading edge 22 of the cylindrical outer surface 23 and a fourth surface 4 extending from the trailing side 29 of the central portion 14 to the trailing edge 24 of the cylindrical outer surface 23.

Provided in the vane 11 are means comprising a passage or passages 25, bordered at 26, for applying simultaneously against the third surface 3 the pressure to which the first surface 1 is subjected, and means comprising a passage or passages 27, bordered at 28, for applying simultaneously against the fourth surface 4 the pressure to which the second surface 2 is subjected. The areas of the first, second, third, and fourth surfaces 1, 2, 3, 4 are selected to provide a net rotational moment from the intermittently different pressures thereon that is substantially equal and opposite to the moment resulting from the pressures on the bearing surface 17.

The bearing surface 17 comprises approximately a portion of a right circular cylinder with its axis substantially parallel to the axis of the inner cam surface 91 (FIG. 2), and preferably is wider than the diameter of the central portion 14, as in FIG. 1. The adjacent region 31 of the first surface 1 extends approximately perpendicularly from the leading edge 18 of the bearing surface 17 and the adjacent region 32 of the second surface 2 extends approximately perpendicularly from the trailing edge 20 of the bearing surface 17.

As shown in FIG. 1, the moment compensator portion 21 typically is substantially coaxial (at 13) with the central portion 14 and its radius (from the axis 13 to the surface 23) is greater than the radius (from the axis 13 to the surfaces 19, 29) of the central portion. Also as shown in FIG. 1, the vane tip 12 typically is substantially symmetrical about a plane 33 between its leading side (the surfaces 1, 19, and 3) and its trailing side (the surfaces 2, 29, and 4), and the device 80 may be reversible to rotate in either direction. In the assembly 10 of FIG. 1, the pivot axis 13 of the vane tip 12 is in a fixed position relative to the vane 11.

The radius of curvature of the bearing surface 17 is smaller than that of any portion of the adjacent inner cam surface 7. The center of curvature of the bearing surface typically lies in the plane of symmetry 33. The relative convexity of the bearing surface 17 is desirable in typical high-speed operation where a film of fluid is present continuously between the bearing surface 17 and the inner cam surface 7 during rotation.

The cylindrical outer surface 23 of the moment compensator portion 21 of the vane tip 12 maintains substantially continuous at least line contact (at 34) with the vane 11 over their length to form a seal between the pressure on the third surface 3 and the pressure on the fourth surface 4.

The pivot axis 13 of the vane tip 12 is in a plane approximately equidistant from the leading edge 18 and the trailing edge 20 of the bearing surface 17, namely in the plane of symmetry 33 between its leading side (1, 19, 3) and its trailing side (2, 29, 4).

If the device 80 is intended to rotate in one direction only, say the clockwise direction as indicated at 89 in FIG. 2 and at 37 in FIG. 1, the bearing pad portion 16 of the rotating vane tip 12 may be unsymmetrical. For example, if the trailing region of the bearing pad portion 16 were shortened so as to end at the plane 36, the pivot axis 13 of the vane tip 12, in the plane 33, would be nearer to the trailing edge 35 than to the leading edge 18 of the bearing surface 17. This can be advantageous in many high-speed devices.

The end of the vane 11 forms a recess 40 along its length within which recess 40 the moment compensator portion 21 and a substantial part of the central portion 14 of the vane tip 12 are positioned with the leading side 19 of the central portion 14 maintaining substantially at least line contact (at 41) along at least a portion of its length with a leading surface 42 in the recess 40, and with the trailing side 29 of the central portion 14 maintaining substantially at least line contact (at 43) along at least a portion of its length with a trailing surface 44 in the recess 40. The cylindrical outer surface 23 of the moment compensator portion 21 maintains substantially continuous at least line contact (at 34) with an inner surface 45 in the recess 40 over their length to form a seal between the leading and trailing regions of the recess 40. A portion of the leading region of the recess 40 forms a leading chamber 46 therein adjacent the third surface 3 of the vane tip 12, and a portion of the trailing region of the recess 40 forms a trailing chamber 47 therein adjacent the fourth surface 4 of the vane tip 12.

At least one passage 25 is provided in the leading portion of the vane 11 for communicating the leading chamber 46 in the recess 40 with the region 48 between the rotor 8 and the cam 9 adjacent the leading side of the vane 11, and at least one passage 27 is provided in the trailing portion of the vane 11 for communicating the trailing chamber 47 in the recess 40 with the region 49 between the rotor 8 and the cam 9 adjacent the trailing side of the vane 11.

In FIG. 1, the circular cylindrical surfaces 19 and 29 of the central portion 14 of the rotating vane tip 12 make line contact at 41 and 43 with the substantially flat leading and trailing surfaces 42 and 44, respectively, at each end of the recess 40, and in one or more regions between the ends if the passages 25 and 27 are not cut away along the entire distance between the supporting and guiding surfaces at the ends. If surface contact is preferred, the surfaces 42 and 44 may comprise circular cylindrical regions adjacent the surfaces 19 and 29 at 41 and 43. Similarly, the inner surface 45 of the recess 40 may comprise a circular cylindrical region adjacent the circular cylindrical surface 23 of the moment compensator portion 21 at 34, if surface contact is desired for the seal between the regions 46 and 47.

The vane end and tip assembly 10 of FIG. 1 is useful in a wide variety of apparatus. For convenience, FIG. 2 shows a simple device in which the assembly is advantageous.

In FIG. 2, a single-lobe rotary moving-fluid device 80 comprises a cylindrical rotor 8 having vanes 11 (only the protruding portions of which are shown schematically in FIG. 2) that are slidable in substantially radial directions therein, the tip of each vane 11 maintaining substantial contact with the inner cylindrical surface 7 of a cam 9 surrounding the rotor 8 as it traverses sealing spaces 85, 86 and port spaces 87, 88 in the cam 9 alternately during rotation clockwise, as indicated at 89, about the center of rotation 90.

The inner surface 7 of the cam 9 is substantially circular in cross section, the center of curvature being at 91. The center of rotation 90 of the rotor 8 is located on the diameter 92 through the center of curvature 91 to one end 93 (on the leading edge) of the sealing space 85, and to one end 94 (on the trailing edge) of the sealing space 86. The device 80 can be either a fixed-displacement device with the center of rotation 90 located as shown in FIG. 2, or a variable displacement device wherein, to reduce the rate of displacement, the center of rotation 90 can be moved to other positions along the diameter 92 toward the center of curvature 91.

If the device is used as a pump, the discharge or outlet pressure is greater than the inlet pressure. This means that when the tip 11 is on the pumping lap space 85, the pressure in front of the tip is greater than the pressure behind it. Similarly when the tip is on the sealing lap space 86, the pressure in front of the tip is less than the pressure behind it. Thus pressure differentials not only exist across the tip on all lap spaces, but also vary in direction. The tip moment compensator counteracts the alternating moments produced by these pressure differentials.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. In a sliding-vane rotary moving-fluid device of the type comprising a cylindrical rotor having vanes slidable in substantially radial directions therein with the tip of each vane maintaining substantial contact with the inner cylindrical surface of a cam surrounding the rotor as it traverses sealing spaces and port spaces in the cam alternately during rotation and with the vane and tip thereby intermittently subjected to differences in pressure between the leading and trailing sides thereof, a vane end and tip assembly at the outer end of each vane comprising
  a vane tip mounted in the end of the vane to be pivotable about an axis substantially parallel to the axis of the rotor, comprising
  a central portion comprising substantially a right circular cylinder,
  a bearing pad portion extending radially from the central portion toward the cam and having adjacent the inner cam surface a bearing surface of curvature that is at least equal to that of the inner cam surface, a first surface extending from the leading edge of the bearing surface to the leading side of the central portion, and a second surface extending from the trailing edge of the bearing surface to the trailing side of the central portion, and a moment compensator portion extending radially from the central portion substantially oppositely from the bearing pad portion, comprising approximately a portion of a right circular cylinder with its axis parallel to the axis of the central portion, having a third surface extending from the leading side of the central portion to the leading edge of the cylindrical outer surface and a fourth surface extending from the trailing side of the central portion to the trailing edge of the cylindrical outer surface, means for applying simultaneously against the third surface the pressure to which the first surface is subjected, and means for applying simultaneously against the fourth surface the pressure to which the second surface is subjected, the areas of the first, second, third, and fourth surfaces being selected to provide a net rotational moment from the intermittently different pressures thereon that is substantially equal and opposite to the moment resulting from the pressures on the bearing surface.

2. The subject matter of claim 1, wherein the bearing surface comprises approximately a portion of a right circular cylinder with its axis substantially parallel to the axis of the inner cam surface.

3. The subject matter of claim 1, wherein the bearing surface is wider than the diameter of the central portion.

4. The subject matter of claim 1, wherein the adjacent region of the first surface extends approximately perpendicularly from the leading edge of the bearing surface and the adjacent region of the second surface extends approximately perpendicuarly from the trailing edge of the bearing surface.

5. The subject matter of claim 1, wherein the moment compensator portion is substantially coaxial with the central portion and its radius is greater than the radius of the central portion.

6. The subject matter of claim 1, wherein the vane tip is substantially symmetrical about a plane between its leading side and its trailing side.

7. The subject matter of claim 1, wherein the pivot axis of the vane tip is in a fixed position relative to the vane.

8. The subject matter of claim 2, wherein the radius of curvature of the bearing surface is smaller than that of any portion of the adjacent inner cam surface.

9. The subject matter of claim 1, wherein a film of fluid is present continuously between the bearing surface and the inner cam surface during rotation.

10. The subject matter of claim 1, wherein the cylindrical outer surface of the moment compensator portion of the vane tip maintains substantially continuous at least line contact with the vane over their length to form a seal between the pressure on the third surface and the pressure on the fourth surface.

11. The subject matter of claim 1, wherein the pivot axis of the vane tip is in a plane approximately equidistant from the leading and trailing edges of the bearing surface.

12. The subject matter of claim 6, wherein the pivot axis of the vane tip is in the plane of symmetry between its leading and trailing sides.

13. The subject matter of claim 1, wherein the pivot axis of the vane tip is in a plane nearer to the trailing edge than to the leading edge of the bearing surface.

14. The subject matter of claim 1, wherein the end of the vane forms a recess along its length within which recess the moment compensator portion and a substantial part of the central portion of the vane tip are positioned with the leading side of the central portion maintaining substantially at least line contact along at least a portion of its length with a leading surface in the recess, with the trailing side of the central portion maintaining substantially at least line contact along at least a portion of its length with a trailing surface in the recess, with the cylindrical outer surface of the moment compensator portion maintaining substantially continuous at least line contact with an inner surface in the recess over their length to form a seal between the leading and trailing regions of the recess, with a portion of the leading region of the recess forming a leading chamber therein adjacent the third surface of the vane tip, and with a portion of the trailing region of the recess forming a trailing chamber therein adjacent the fourth surface of the vane tip.

15. The subject matter of claim 14, comprising also means for communicating the leading chamber in the recess with the between the rotor and the cam adjacent the leading side of the vane.

16. The subject matter of claim 15, comprising also means for communicating the trailing chamber in the recess with the region between the rotor and the cam adjacent the trailing side of the vane.

17. The subject matter of claim 16, wherein the communicating means comprise passages in the vane from the leading and trailing chambers to the respective leading and trailing regions between the rotor and the cam.

* * * * *